(12) United States Patent
Yu et al.

(10) Patent No.: US 11,639,454 B2
(45) Date of Patent: May 2, 2023

(54) ADHESIVE FOR JOINING METALS AND RESINS, ITS ADHESIVE LAYER AND APPLICATION THEREOF

(71) Applicant: CJ Technology Co., Ltd., New Taipei (TW)

(72) Inventors: Tse Wei Yu, Hsinchu County (TW); Hao-Han Fan, Hsinchu County (TW)

(73) Assignee: CJ TECHNOLOGY CO., LTD., New Taipei (TW)

( * ) Notice: Subject to any disclaimer, the term of this patent is extended or adjusted under 35 U.S.C. 154(b) by 308 days.

(21) Appl. No.: 17/064,728

(22) Filed: Oct. 7, 2020

(65) Prior Publication Data
US 2021/0108115 A1 Apr. 15, 2021

(30) Foreign Application Priority Data
Oct. 9, 2019 (TW) .................................. 108136690

(51) Int. Cl.
| | |
|---|---|
| *C09D 5/08* | (2006.01) |
| *C09J 183/08* | (2006.01) |
| *C08K 5/00* | (2006.01) |
| *C09J 183/14* | (2006.01) |
| *C08G 77/58* | (2006.01) |
| *B32B 27/30* | (2006.01) |
| *B32B 27/28* | (2006.01) |
| *B32B 27/38* | (2006.01) |

(52) U.S. Cl.
CPC ............ *C09J 183/08* (2013.01); *C08G 77/58* (2013.01); *C08K 5/0025* (2013.01); *C09D 5/08* (2013.01); *C09D 5/086* (2013.01); *C09J 183/14* (2013.01); *B32B 27/281* (2013.01); *B32B 27/308* (2013.01); *B32B 27/38* (2013.01); *C09J 2203/326* (2013.01)

(58) Field of Classification Search
CPC ......................................................... C09J 4/00
USPC ............... 106/287.17, 287.19, 287.1–287.16
See application file for complete search history.

(56) References Cited

U.S. PATENT DOCUMENTS

| | | | | |
|---|---|---|---|---|
| 5,063,081 | A * | 11/1991 | Cozzette | G01N 35/0099 435/7.1 |
| 6,475,329 | B1 * | 11/2002 | Johnson | C08J 5/125 106/287.11 |
| 8,383,240 | B2 * | 2/2013 | Corsaro | C09J 5/02 156/325 |
| 2006/0099429 | A1 * | 5/2006 | Domes | C09D 4/00 427/372.2 |
| 2007/0099000 | A1 * | 5/2007 | Hirano | C09D 185/00 106/287.19 |
| 2008/0245271 | A1 * | 10/2008 | Trabesinger | C09J 5/02 106/287.19 |

FOREIGN PATENT DOCUMENTS

JP 2015-010178 * 1/2015

\* cited by examiner

*Primary Examiner* — Marc S Zimmer
(74) *Attorney, Agent, or Firm* — WPAT, PC

(57) ABSTRACT

An adhesive for joining metals and resins is disclosed. The adhesive comprises 0.0001~3 wt. % of amino silane, 0.0001~1 wt. % of a crosslinker and 0.0001~3 wt. % of an organometallic compound. In particular, the adhesive forms an adhesive layer that has a metal atomic ratio less than 50%.

7 Claims, 6 Drawing Sheets

Atomic ratio at the Cu/polyimide interface: Si (10%) Zr (5%) N (10~20%)

Remark: Zr and N(amine) were integrated into the silane polymer

Atomic ratio at the Cu/polyimide interface: Si (80%) Al (30~40%) N (10%)

Remark: Al and N (amine) were integrated into the silane polymer

ADHESIVE FOR JOINING METALS AND RESINS, ITS ADHESIVE LAYER AND APPLICATION THEREOF

TECHNICAL FIELD OF THE INVENTION

The invention relates to an adhesive for joining metals and resins. The adhesive comprises an amino-silane, a cross linker and an organometallic compound. In particular, adhesive layer formed by the adhesive has a metal atomic ratio less than 50%, so as to apply in electronic packaging industry, such as semiconductor packaging process.

BACKGROUND OF THE INVENTION

With the increasing demand of reducing form factors for handheld communication devices and smart wearable gadgets, advanced semiconductor packaging solution such as Integrated Fan-Out (InFO) WLP (wafer level packaging) and TSV (through-silicon-via) will be continuingly developed to meet the rapid scaling trends.

Since TSV and solder bumps do not overlap and one TSV may connect with more than one bumps, it is necessary to manufacture redistribution layer (RDL) to spread the bumps over the entire chip surface. In typical RDL structures, one metal layer is sandwiched between two passivation layers, such as polyimide (PI), polybenzoxazole (PBO), benzocyclobutene (BCB), acrylates, or epoxy. One of the key challenges in manufacturing Cu RDL level is to maintain the adhesion and mechanical reliability between heterogeneous interfaces such as Cu/polyimide or Cu/epoxy. Although passivation layers possess high thermal resistance (high Tg) to withstand the high temperature processes such as solder reflow, their susceptibility to moisture and oxygen diffusion under high temperature will cause serious copper oxide growth, therefore compromising the reliability of the Cu RDL level.

Based on the aforementioned description, there is a continuing need to develop a process or solution to overcome the bottleneck in manufacturing redistribution layers or in advanced packaging industries.

SUMMARY OF THE INVENTION

In one aspect of the invention, an adhesive for joining metals and resins is disclosed. The adhesive comprises 0.0001-3 weight percent of an amino silane, 0.0001-1 weight percent of a crosslinker and 0.0001-1 weight percent of an organometallic compound. The weight percent is calculated based on total weight of the adhesive.

In general, the adhesive further comprises 0.0005-95 weight percent of water or organic solvents.

The adhesive forms an adhesive layer having 3-dimensional (3D) networks between the metals and resins. Therefore, the adhesive layer is able to enhance its peel strength. Moreover, the organometallic compounds are able to prevent the adhesive layer from damages caused by moisture, oxygen and high temperature. Accordingly, the adhesive is much suitable for using in electronic packaging industry, such as semiconductor packaging process.

In another aspect of the invention, an adhesive layer is disclosed. The adhesive layer is formed by the aforementioned adhesive and has a metal atomic ratio less than 50%.

In general, the adhesive layer comprises characteristic peaks at 660~690 $cm^{-1}$, 900~1100 $cm^{-1}$, 1100~1380 $cm^{-1}$, 1400~1500 $cm^{-1}$ and 3200~3400 $cm^{-1}$ in a FTIR spectrum. Additionally characteristic peaks at 1550~1650 $cm^{-1}$ and 2800~3000 $cm^{-1}$ are also included in the FTIR spectrum.

The characteristic peaks at 900~1200 $cm^{-1}$ prove the adhesive layer has 3-dimensional (3D) networks structure construct by bonding of Si, O and metals (Si—O-M) and siloxane bond (Si—O—Si).

The aforementioned adhesive layer with 3-dimensional (3D) networks structure is able to prevent the adhesive layer from damages caused by moisture, oxygen and high temperature. As a result, the adhesive layer is much suitable to be a part of electronic devices. Typically, the adhesive layer is a part of a semiconductor, a circuit board, a liquid crystal board or a light emitting diode.

In still another aspect of the invention, a method for preventing metals from oxidation is provided. The method comprises a step of using the adhesive to form a film on surfaces of the metals for preventing the metals from oxidation.

In general, the metals comprise Cu, Al, Ti, Ni, Sn, Fe, Ag, Au, Zr or an alloy. Preferably, the alloy is composed of one selected from the group consisting of Cu, Al, Ti, Ni, Sn, Fe, Ag, Au, Zr and their combinations.

In conclusion, the present invention provides the adhesive for joining metals and resins. The adhesive comprises the amino silane, the crosslinker and the organometallic compound. The adhesive is used to form an adhesive layer having a 3-dimensional (3D) network structure between the metals and resins. Therefore, the adhesive layer possesses a good thermal stability, and is able to enhance its peel strength and avoid damages caused by moisture, oxygen and high temperature. Furthermore, the adhesive protects metal substrates from oxidation and avoid formation of metal oxides and voids on surface of the adhesive layer during heating or joining process between the metal substrates and resins. Accordingly, the invented adhesive is much suitable for using in industries require to joining metals and resins or plastics, such as electronic device packaging industry.

BRIEF DESCRIPTION OF THE PREFERRED EMBODIMENTS

Figure 1:
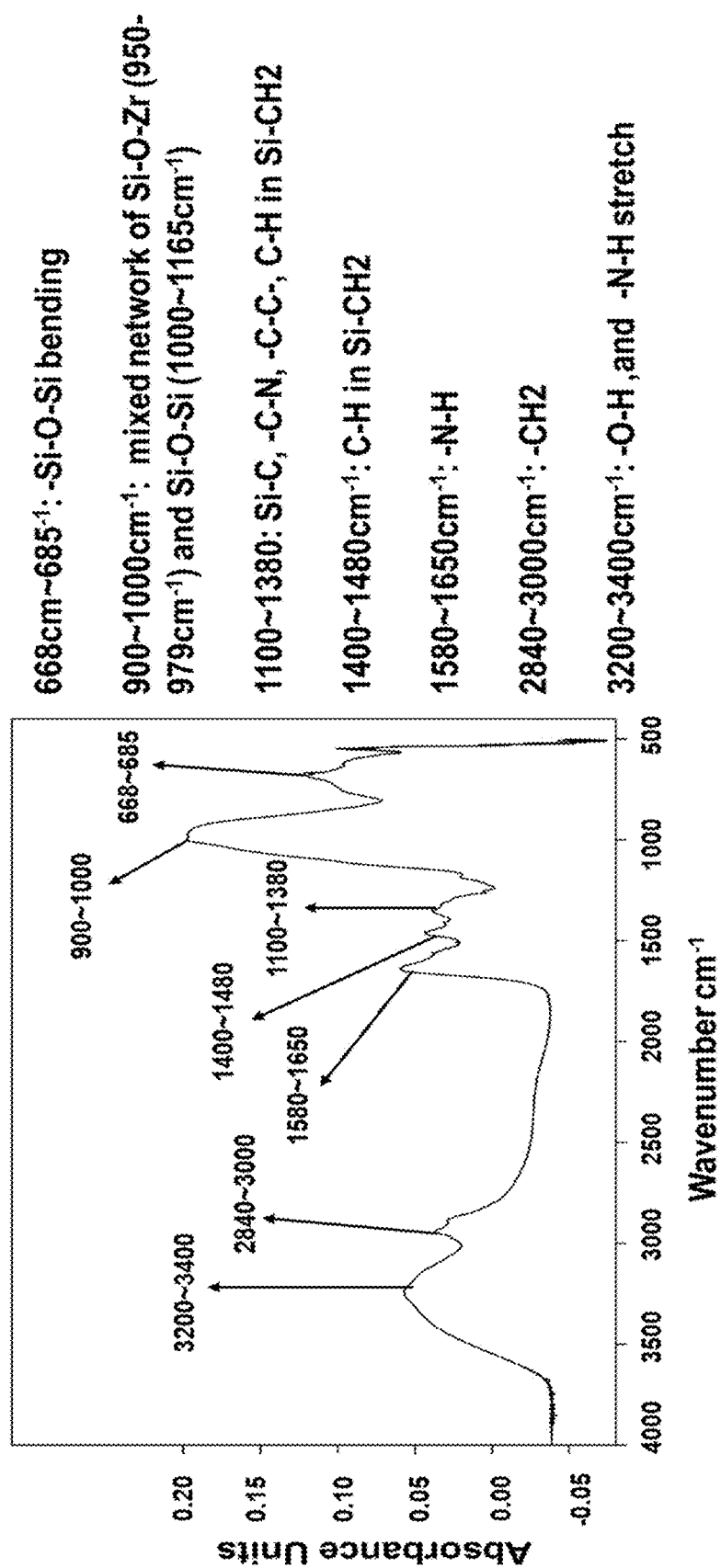
FIG. 1 is FTIR spectrum of adhesive layer formed by composition D.

In a first embodiment, the invention discloses an adhesive for joining metals and resins. The adhesive for joining metals and resins comprises 0.0001-3 weight percent of amino silane, 0.0001-1 weight percent of a crosslinker and 0.0001-1 weight percent an organometallic compound, and the weight percent is calculated based on total weight of the adhesive.

In one example of the first embodiment, the adhesive for joining metals and resins comprises 0.5-1 weight percent of the amino silane, 0.1-0.5 weight percent of the crosslinker and 0.2-0.5 weight percent of the organometallic compound.

In one example of the first embodiment, the adhesive for joining metals and resins further comprises 0.0005-95 weight percent of water. Preferably, the adhesive for joining metals and resins further comprises 10-50 weight percent of water.

In one example of the first embodiment, the adhesive for joining metals and resins further comprises 0.0005-95 weight percent of solvents. Preferably, the adhesive for joining metals and resins further comprises 50-90 weight percent of solvents.

The solvents comprise protic solvents or aprotic solvents. Preferably, the solvents comprise alcohol, ether, ketone, N-methyl pyrrolidone (NMP), dimethyl sulfoxide (DMSO), 1,3-dimethyl-2-imidazoline or their mixture.

In one example of the first embodiment, the amino silane is a compound shown as formula (1), and $R_1$ is a C1~C10 alkyl group or a C1~10 alkyl group containing amino group; and $R_2$ is a C1~C3 alkyl group.

$$(NH_2-R_1)-Si-(O-R_2)_3 \quad (1)$$

In one preferable example, the amino silane comprises (3-aminopropyl)trimethoxysilane, N-[3-(trimethoxysilyl)propyl]ethylenediamine, N-(3-trimethoxysilylpropyl)diethylenetriamine, 1-[3-(trimethoxysilyl)propyl]urea, trimethoxy[3-(methylamino)propyl]silane, (N,N-dimethylaminopropyl)trimethoxysilane, N-(3-triethoxysilylpropyl)diethanolamine, triethoxy-3-(2-imidazolin-1-yl)propylsilane, trimethoxylsilylpropyl modified (polyethylene)imine or their combinations.

In one example of the first embodiment, the crosslinker has a formula (2), and $R_3$ is C1~C10 alkyl groups or C1-C10 alkyl groups with additional function groups selected from the group consisting of amino group, hydroxyl group, carbonyl group, aromatic group, siloxane group and their combinations.

$$Si-(O-R_3)_4 \quad (2)$$

In one preferable example, the crosslinker comprises tetraethoxysilane, bis[3-(trimethoxysilyl)propyl]amine, N,N'-bis[(3-trimethoxysilyl)propyl]ethylenediamine, N,N'-bis(2-hydroxyethyl)-N,N'-bis(trimethoxysilylpropyl)ethylenediamine or a compound has a formula (3).

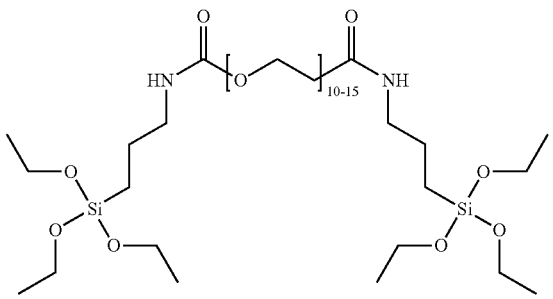

(3)

In one example of the first embodiment, the organometallic compound has a formula of (4) where M is Ti or Zr or a formula (5) where M
is Al or Y; $R_a$ is straight C1-C5 alkyl group or branched C1-C5 alkyl group.

$$M-(OR_4)_4 \quad (4)$$

$$M-(OR_4)_3 \quad (5)$$

In one example of the first embodiment, the adhesive forms a thermal stable adhesive layer or a redistribution layer. The thermal stable adhesive layer or redistribution layer has a metal atomic ratio less than 50%.

In a second embodiment, the invention provides an adhesive layer. The adhesive layer is formed by the adhesive of the first embodiment, and has a metal atomic ratio less than 50%.

In one example of the second embodiment, the metal atomic ratio is Cu atomic ratio, Al atomic ratio, Ti atomic ratio, Zr atomic ratio or Y atomic ratio.

In one example of the second embodiment, the adhesive layer is a part of a semiconductor, a circuit board, a liquid crystal board or a light emitting diode.

In one example of the second embodiment, the adhesive layer comprising characteristic peaks at 660~690 $cm^{-1}$, 900~1100 $cm^{-1}$, 1100~1380 $cm^{-1}$, 1400~1500 $cm^{-1}$ and 3200~3400 $cm^{-1}$ in a FTIR spectrum.

Additionally characteristic peaks at 1550~1650 $cm^{-1}$ and 2800~3000 $cm^{-1}$ are also included in the FTIR spectrum.

The characteristic peaks at 900~1200 $cm^{-1}$ prove the adhesive layer has 3-dimensional (3D) networks structure construct by bonding of Si, O and metals (950~980 $cm^{-1}$; Si—O-M) and siloxane bond (1000~1165 $cm^{-1}$; Si—O—Si).

The adhesive layer has the 3-dimensional (3D) networks structure which formed by crosslinking bond with Si—O-M and Si—O—Si. In general, the chemical structure is shown as formula (5).

(6)

M is Al, Ti, Zr or Y. O is oxygen. A, B, C and D represent Si—O-M bond formed by the crosslinker Si—(O—$R_3$)$_4$ and organometallic compound M-(OR$_4$)$_4$ or Si—O—Si bond formed by condensation of the crosslinker and organometallic compound, respectively.

In a third embodiment, the invention discloses a method for preventing metals from oxidation. The method comprises a step of using the adhesive of the first embodiment to form a film on surfaces of a metal for preventing the metal from oxidation.

In one example of the third embodiment, the metal comprises Cu, Al, Ti, Ni, Sn, Fe, Ag, Au, Zr or an alloy. Preferably, the alloy is composed of one selected from the group consisting of Cu, Al, Ti, Ni, Sn, Fe, Ag, Au, Zr and their combinations.

In one example of the third embodiment, the film is to join the metal to a resin. The resin comprises polyimide, epoxy resin, polyacrylate, polybenzoxazole, polybenzocylobutene or their combinations.

In one example of the third embodiment, the method use in a redistribution layer process Working examples of the invention are described as following paragraphs.

Example: General Procedure for Preparing the Adhesive Layer

The adhesive layer forms by dip-coating or spray-coating the invented adhesive composition on testing samples at ambient temperature or elevated temperature. Processing time varies from 1.5~5 minutes, depending on the desired thickness of the adhesive layer. After coating process is finished, the remaining residual solvents can be rinsed off by water or spun off by high rotation speed, following by nitrogen or air blow process to facilitate the drying process.

According to the general procedure, some representative adhesive layers are prepared and list in Table 1. Composition A and H are control groups without adding organometallic compounds, respectively. Composition B is a control group without adding the crosslinker.

N-(3-Trimethoxysilylpropyl)diethylenetriamine has following structure (6)

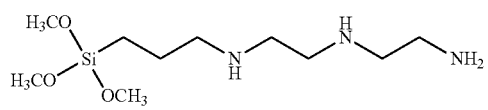

N-[3-(Trimethoxysilyl)propyl]ethylenediamine has following structure (7)

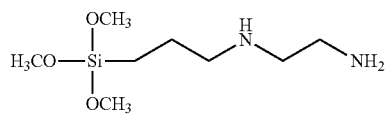

N,N-Bis[3-(trimethoxysilyl)propyl]amine has following structure (8)

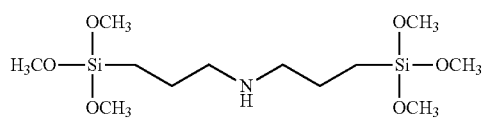

Analysis of Chemical Structure and Bonding of the Adhesive Layer

Use Fourier Transform Infrared Spectroscopy (FTIR) to analyze chemical structure and bonding of the adhesive layer. The FTIR spectrum of the adhesive layer typically comprises following characteristic peaks. 660~690 $cm^{-1}$ (—Si—O—Si bending), 900~1100 $cm^{-1}$ (mixed network of Si—O-M (950-980 $cm^{-1}$) and Si—O—Si (1000~1165 $cm^{-1}$), 1100~1380 $cm^{-1}$ (Si—C, —C—N, —C—C—, C—H in Si—CH2), 1400~1500 $cm^{-1}$ (CH in Si—CH2), 1550~1650 $cm^{-1}$ (—NH), 2800~3000 $cm^{-1}$ (—$CH_2$) and 3200~3400 $cm^{-1}$ (—OH, —NH stretch).

Analysis of Cross Section of the Adhesive Layer

Figure 2:
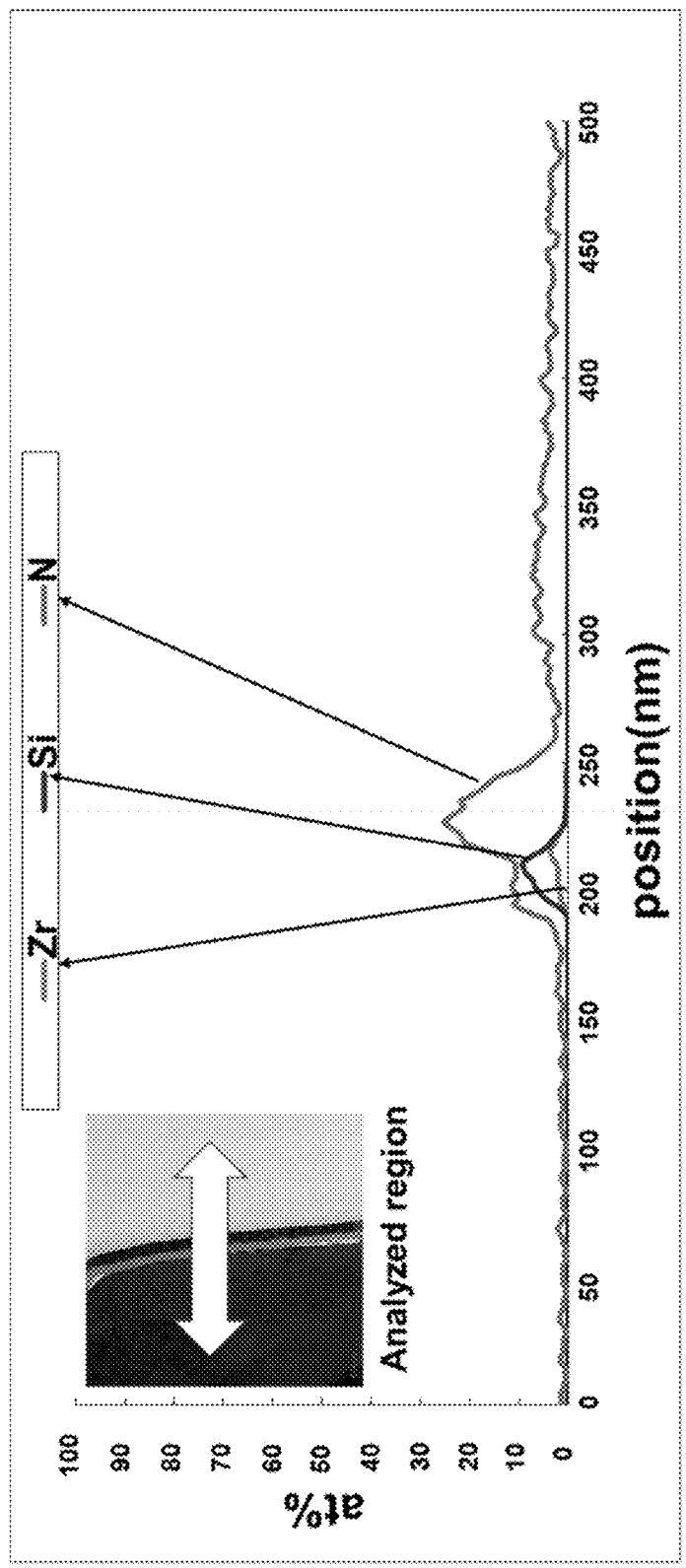
FIG. 2 is TEM EDX Line spectrum of adhesive layer formed by composition D.
Figure 3:
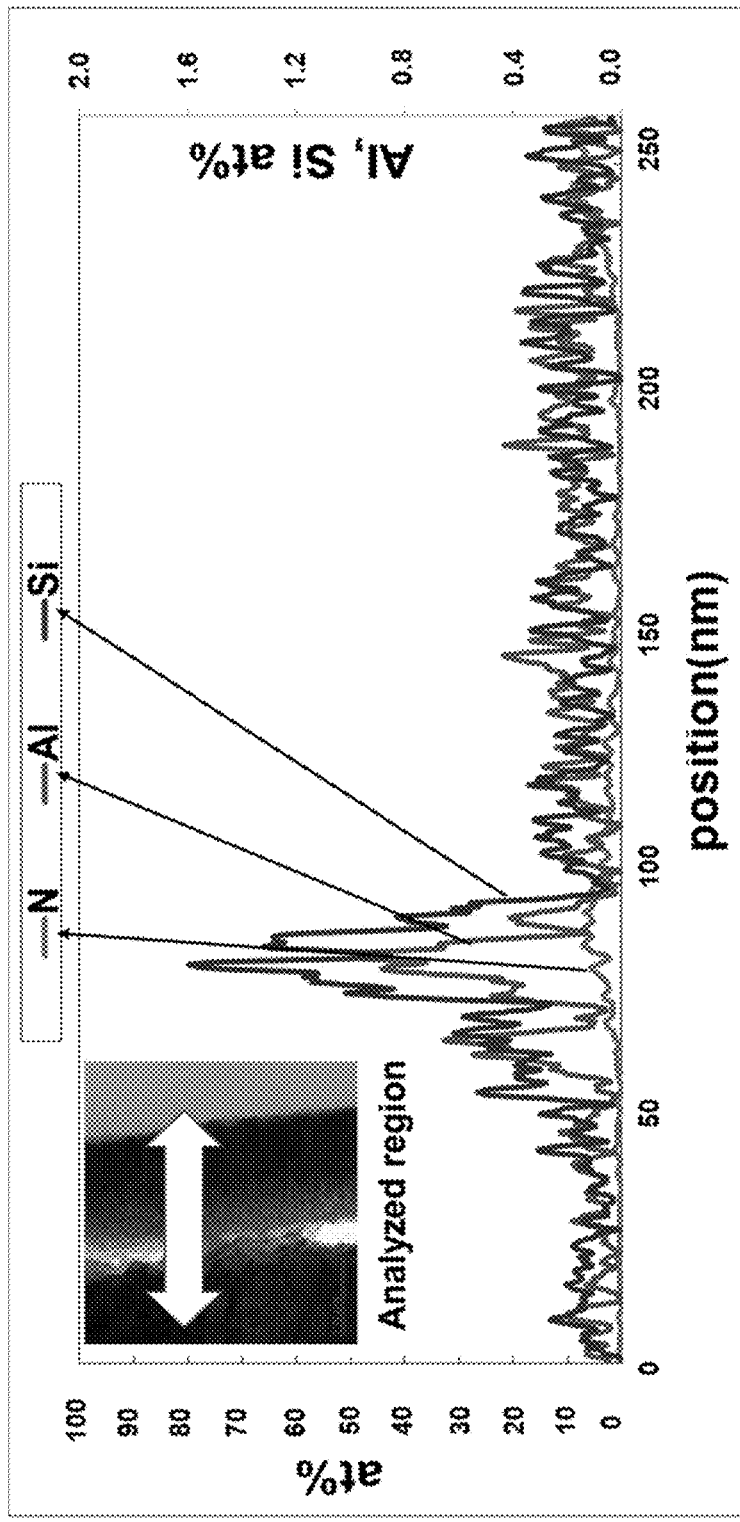
FIG. 3 is TEM EDX Line spectrum of adhesive layer formed by composition E.

Use Transmission Electron Microscope (TEM) to analyze cross section of the adhesive layer. TEM analysis indicate the adhesive layer formed by composition D has a Zr atomic ration about 5% as shown in FIG. 2; and the adhesive layer formed by composition H has a Al atomic ration about 30~40% as shown in FIG. 3.

Analysis of Thermal Properties of the Adhesive Layer

Figure 4:
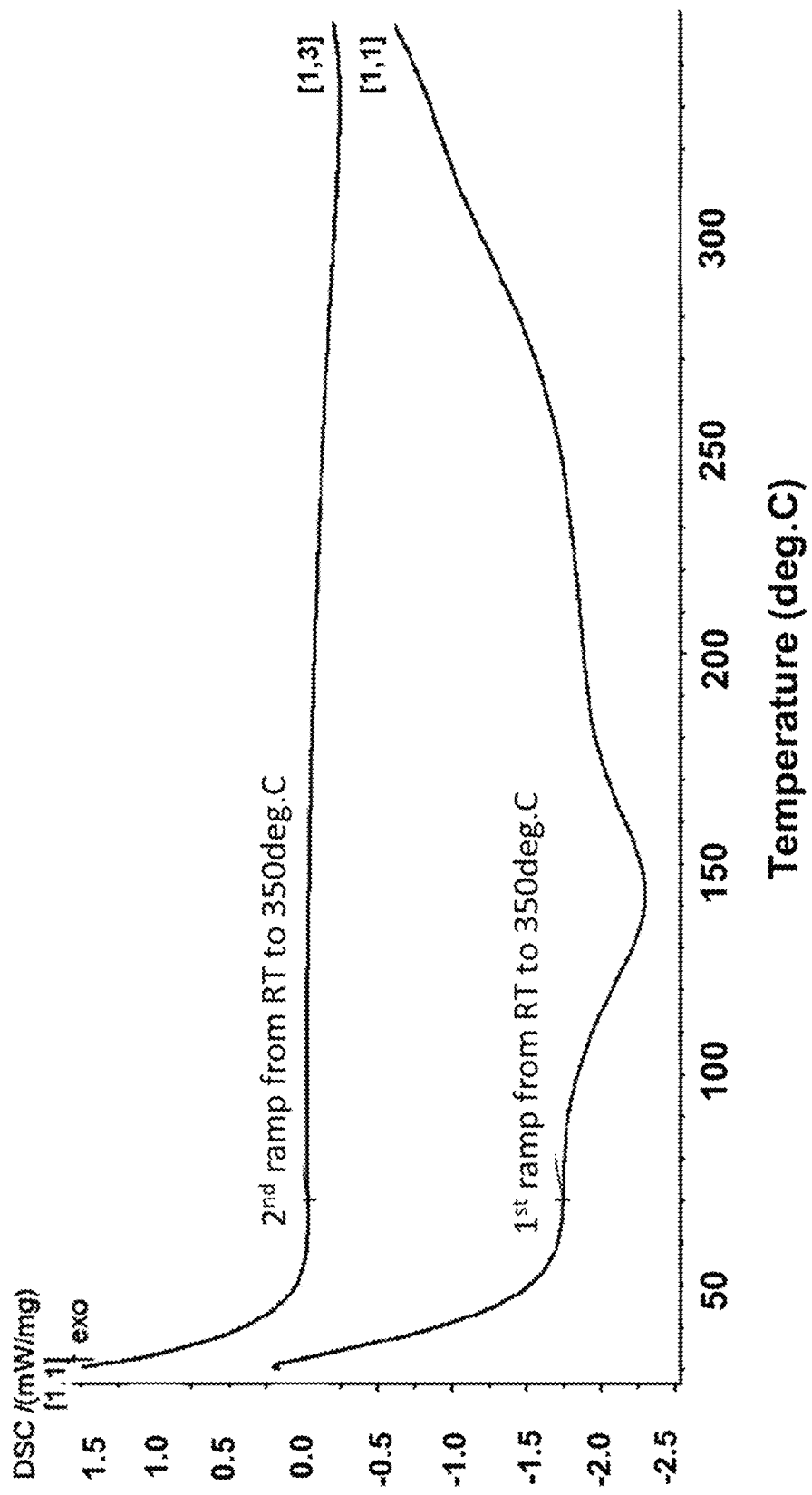
FIG. 4 is DSC spectrum of adhesive layer formed by composition D.

Use DSC to analyze thermal stability of the adhesive layer. As shown in FIG. 4, DSC analysis indicates the adhesive layer formed by composition D does not observe exothermic reaction at 25~350° C., and that means the structure of the adhesive layer formed by composition D is thermal stable.

Oxidation Testing of Metal Substrates

Figure 5:
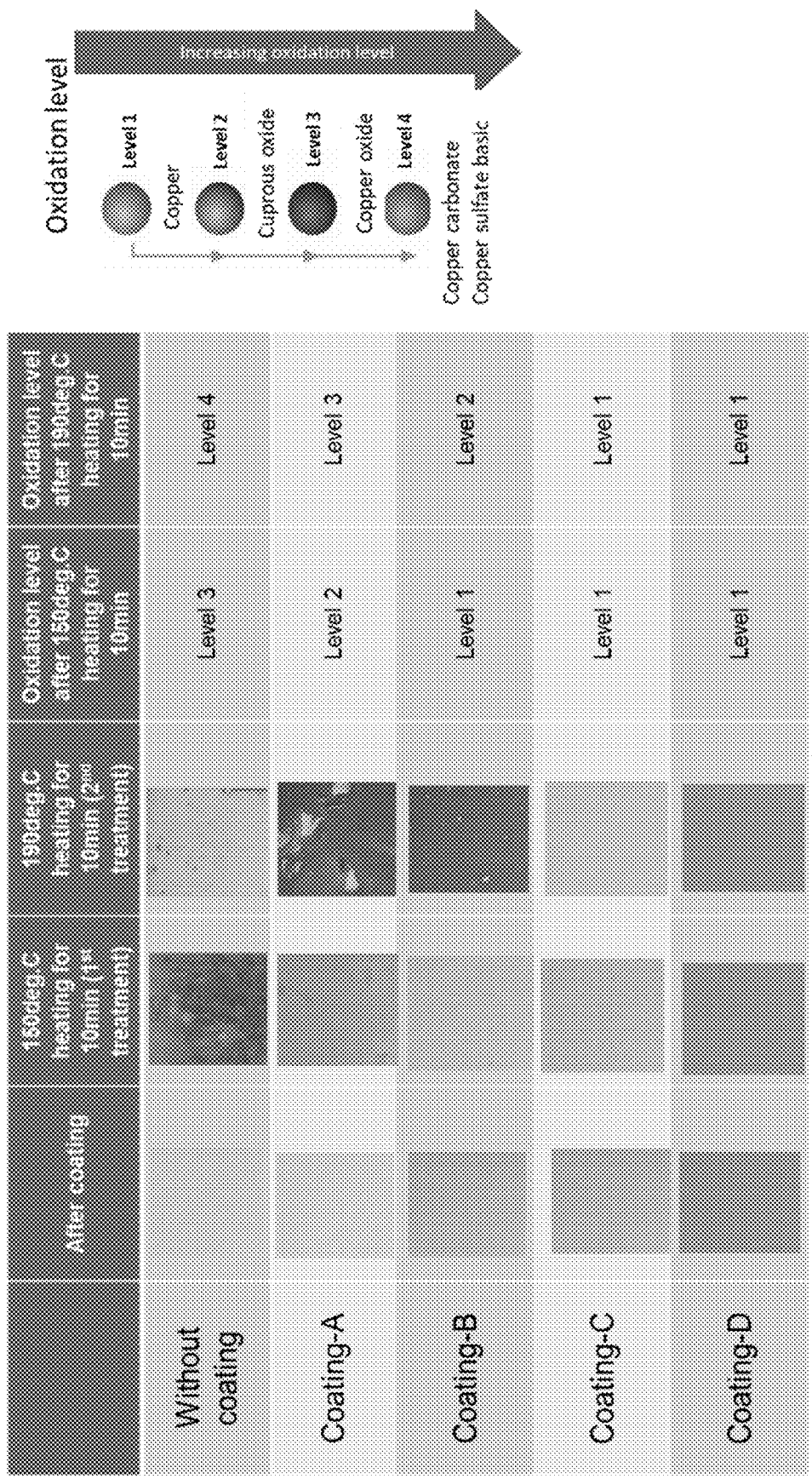
FIG. 5 is images of oxidation testing of Cu/Si substrate.

The testing substrate is Cu/Si. Composition A, B, C and D formed a film on surface of the Cu/Si substrate for the oxidation testing, respectively. Control group is Cu/Si substrate without coating any composition. Testing condition is to put samples on a hot plate and heat in air at 150° C. and 190° C. for 10 minutes, respectively. Oxidation level 1 represents no oxidation of Cu is observed. Oxidation level 2 means when Cu is oxidized to $CuO_2$ and the Cu/Si substrate color becomes orange. Oxidation level 3 means when Cu is further oxidized to CuO and the Cu/Si substrate color becomes brown. Oxidation level 4 means when Cu is final oxidized to CuCO3 or CuSO4 and the Cu/Si substrate color becomes green. According to Table 2 AND FIG. 5, the film

TABLE 1

| Composition | Amino-silane | Crosslinker | Organometallic compound | Solvent | H2O |
|---|---|---|---|---|---|
| A | 1 wt.% N-(3-Trimethoxysilylpropyl)diethlyene triamine | 0.2 wt. % N,N-Bis[3-(trimethoxysilyl)propyl]amine | 0 | 78.8 wt. % | 20 wt. % |
| B | 1 wt.% N-(3-Trimethoxysilylpropyl)diethylene triamine | 0 | 0.2 wt. % $M(OR_4)_4$ (M = Al) ($R_4$ = tri-sec butyl) | 78.8 wt. % | 20 wt. % |
| C | 1 wt.% N-(3-Trimethoxysilylpropyl)diethylene triamine | 0.2 wt. % N,N-Bis[3-(trimethoxysilyl)propyl]amine | 0.2 wt. % $M(OR_4)_4$ (M = Al) ($R_4$ = tri-sec butyl) | 78.6 wt. % | 20 wt. % |
| D | 1 wt.% N-(3-Trimethoxysilylpropyl)diethylene triamine | 0.2 wt. % N,N-Bis[3-(trimethoxysilyl)propyl]amine | 0.2 wt. % $M(OR_4)_4$ (M = Zr) ($R_4$ = butyl) | 78.6 wt. % | 20 wt. % |
| E | 1 wt.% N-[3-(Trimethoxysilyl)propyl]ethylenediamine | 0.2 wt. % N,N-Bis[3-(trimethoxysilyl)propyl]amine | 0.5 wt. % $M(OR_4)_4$ (M = Al) ($R_4$ = tri-sec butyl) | 78.3 wt. % | 20 wt. % |
| F | 1 wt.% N-[3-(Trimethoxysilyl)propyl]ethylenediamine | 0.2 wt. % N,N-Bis[3-(trimethoxysilyl)propyl]amine | 0.5 wt. % $M(OR_4)_4$ (M = Ti) ($R_4$ = isopropyl) | 78.3 wt. % | 20 wt. % |
| G | 1 wt.% N-[3-(Trimethoxysilyl)propyl]ethylenediamine | 0.2 wt. % N,N-Bis[3-(trimethoxysilyl)propyl]amine | 0.5 wt. % $M(OR_4)_4$ (M = Zr) ($R_4$ = ethyl) | 78.3 wt. % | 20 wt. % |
| H | 1 wt.% N-[3-(Trimethoxysilyl)propyl]ethylenediamine | 0.2 wt. % N,N-Bis[3-(trimethoxysilyl)propyl]amine | 0 | 78.8 wt. % | 20 wt. % | formed by the adhesive composition A and B are not able to prevent Cu/Si substrate from oxidation. On the contrary, the Cu/Si substrate coated with the film formed by the invented adhesive composition C and D does not become orange color, as a result, the film formed by the invented adhesive composition C and D prevent Cu/Si substrate from oxidation.

TABLE 2

| Coating Composition Oxidation level | 150° C. (10 min) | 190° C. (10 min) |
|---|---|---|
| Control group | 3 | 4 |
| A | 2 | 3 |
| B | 1 | 2 |
| C | 1 | 1 |
| D | 1 | 1 |

Thermal Stability Testing of the Adhesive Layer

The coating compositions C, D, E, F, G and H list in Table 1 is cured at 230° C. for 2 hours for obtaining adhesive layers, respectively.

Figure 6:
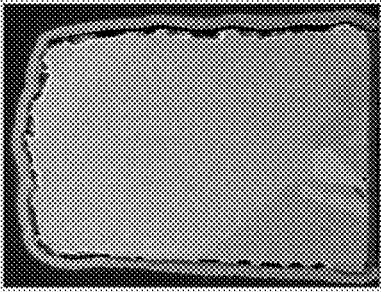
FIG. 6 is images of thermal stability testing of the adhesive layer.

The thermal stability testing is to place the adhesive layers in an oven, heat the adhesive layers to 260° C. at first, keep them at 260° C. for 1 minute, and then cool the adhesive layers to room temperature. Repeat the aforementioned heating-cooling process 20 times and then analyze the adhesive layer properties. The thermal stability testing results are list in Table 3 and shown in FIG. 6.

TABLE 3

| Coating Composition | Oxidation level(nm) | Void level (%) | Morphology |
|---|---|---|---|
| C | 130 | 50 | twisted |
| D | 130 | 1 | normal |
| E | 130 | 80 | normal |
| F | 130 | 90 | twisted |
| G | 130 | 30 | normal |
| H | 130 | 95 | normal |

Evaluation of oxidation level is to measure thickness of the formation of CuO. The thickness of the formation of CuO increases due to oxidation of the Cu bump. Void level represents the pore percent appear in the adhesive layers. More pores appear in the adhesive layers means structure of the adhesive layers is unstable and not able to suffer from oxidation. Morphology represents the appearance of the Cu bump. Twisted appearance represents the adhesive layers are not able to resist the thermal stress relaxation generated by the thermal expansion of Cu bump and the resins Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. An adhesive for joining metals and resins, comprising, 0.0001-3 weight percent of amino silane, wherein the amino silane is a compound shown as formula (1), $$(NH_2-R_1)-Si-(O-R_2)_3 \quad (1)$$

where $R_1$ is a C1~C10 alkyl group or a C1~C10 alkyl group containing amino group, and $R_2$ is a C1~C3 alkyl group;

0.0001-1 weight percent of a crosslinker, wherein the crosslinker has a formula (2), $$Si-(O-R_3)_4 \quad (2)$$

where $R_3$ is C1~C10 alkyl groups or C1~C10 alkyl groups with additional function groups selected from the group consisting of amino group, hydroxyl group, carbonyl group, aromatic group, siloxane group and their combinations;

and 0.0001-1 weight percent of an organometallic compound, wherein the organometallic compound adheres to either formula (4)

$$M-(OR_a)_4 \quad (4)$$

where M is Ti or Zr and $R_4$ is a linear $C_1$-$C_5$ alkyl group or branched $C_1$ to $C_5$ alkyl group;

or formula (5)

$$M-(OR_a)_3 \quad (5)$$

where M is Al or Y and $R_4$ is defined as above.

2. The adhesive of claim 1, further comprises 0.0005-95 weight percent of water.

3. The adhesive of claim 1, further comprises 0.0005-95 weight percent of solvents.

4. An adhesive layer, being formed by the adhesive of claim 1, and the adhesive layer comprises peaks at 660~690 $cm^{-1}$, 90~1100 $cm^{-1}$, 1100~1380 $cm^{-1}$, 1400~1500 $cm^{-1}$ and 3200~3400 $cm^{-1}$ in a FTIR spectrum.

5. The adhesive layer of claim 4, being a part of an article selected from the group consisting of a semiconductor, a circuit board, a liquid crystal board, and a light emitting diode.

6. A method for preventing metals from oxidation, comprising, using the adhesive of claim 1 to form a film on surfaces of a metal for preventing the metal from oxidation, wherein the film is to join the metal to a resin, wherein the resin comprises polyimide, epoxy resin, polyacrylate, polybenzoxazole, polybenzocylobutene or their combinations.

7. The method of claim 6, wherein the metal comprises Cu, Al, Ti, Ni, Sn, Fe, Ag, Au, Zr or an alloy.

* * * * *